(12) United States Patent
Morris et al.

(10) Patent No.: US 9,077,217 B2
(45) Date of Patent: Jul. 7, 2015

(54) MOTOR WITH A SEALING SLEEVE

(75) Inventors: Gareth Edward Morris, Tring (GB); James Andrew Turner, Hemel Hempstead (GB)

(73) Assignee: GOODRICH CONTROL SYSTEMS (GB)

(*) Notice: Subject to any disclaimer, the term of this patent is extended or adjusted under 35 U.S.C. 154(b) by 585 days.

(21) Appl. No.: 13/167,202

(22) Filed: Jun. 23, 2011

(65) Prior Publication Data
US 2012/0001522 A1 Jan. 5, 2012

(30) Foreign Application Priority Data

Jun. 25, 2010 (GB) .................................. 1010676.3

(51) Int. Cl.
*H02K 5/128* (2006.01)
*H02K 11/00* (2006.01)

(52) U.S. Cl.
CPC ........ *H02K 5/128* (2013.01); *H02K 2005/1287* (2013.01)

(58) Field of Classification Search
CPC .... H02K 5/128; H02K 5/1282; H02K 5/1285
USPC ........................................................... 310/86
See application file for complete search history.

(56) References Cited

U.S. PATENT DOCUMENTS

| 5,117,138 | A * | 5/1992 | Trian ............................... 310/89 |
| 6,229,240 | B1 * | 5/2001 | Kech et al. ..................... 310/194 |
| 6,759,774 | B1 * | 7/2004 | Griggs ............................. 310/87 |
| 7,239,056 | B1 * | 7/2007 | Griggs et al. .................... 310/87 |
| 7,658,066 | B2 | 2/2010 | Bildstein et al. |
| 2006/0017339 | A1 | 1/2006 | Chordia et al. |

FOREIGN PATENT DOCUMENTS

| DE | 2033273 | | 1/1972 | |
| DE | 19934382 | | 2/2001 | |
| FR | 2415905 | | 1/1972 | |
| JP | 09317684 | A * | 12/1997 | .............. F04D 13/06 |
| JP | 11294370 | A * | 10/1999 | .............. F04D 13/06 |
| JP | 2001317482 | A * | 11/2001 | .............. F04D 13/06 |
| JP | 2005344589 | A * | 12/2005 | .............. F04D 13/06 |
| WO | 2007098976 | | 9/2007 | |

OTHER PUBLICATIONS

Shimokawa, JP11294370 Machine Translation, Oct. 1999.*
Yamamoto et al., JP2001317482 Machine Translation, Nov. 2001.*
Toyama et al., JP2005344589 Machine Translation, Dec. 2005.*
Nishikawa et al., JP09317684 Machine Translation, Dec. 1997.*
Extended Search Report for Application No. 11250608.4-1809/ 2400639; date of Mailing Jul. 9, 2013.

* cited by examiner

*Primary Examiner* — Quyen Leung
*Assistant Examiner* — Eric Johnson
(74) *Attorney, Agent, or Firm* — Cantor Colburn LLP

(57) ABSTRACT

A motor comprising a motor housing, a stator located within the motor housing, a rotor supported for rotation within the motor housing upon a rotor shaft, the rotor shaft being supported for rotation by bearings, and a sealing sleeve, wherein the sealing sleeve is of closed ended form and encircles the rotor, the sealing sleeve being sealed adjacent its open end to the motor housing.

10 Claims, 1 Drawing Sheet

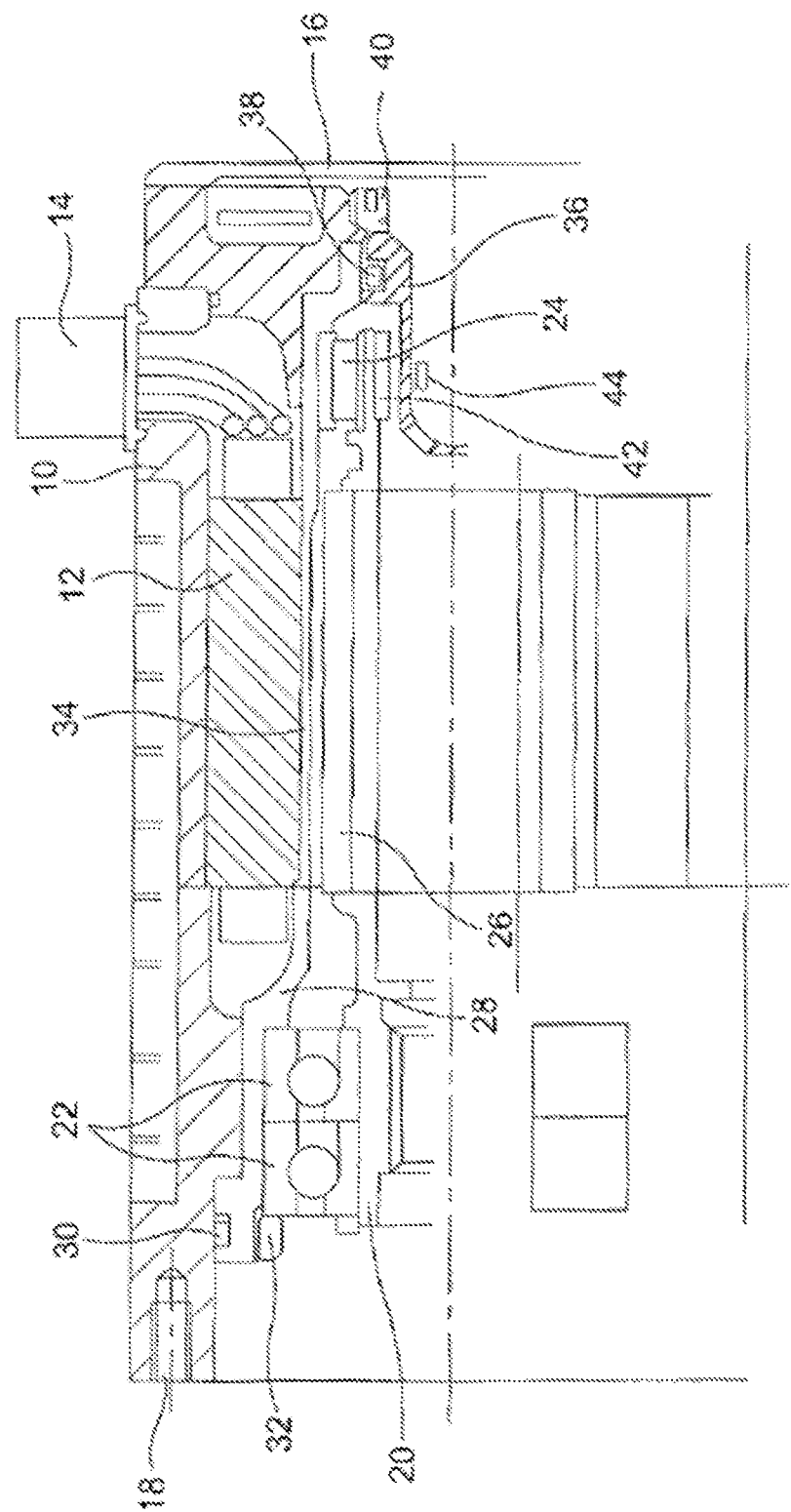

MOTOR WITH A SEALING SLEEVE

This invention relates to a motor, and more particularly to an electrically operated motor, for example to a motor suitable for use in an integrated electric motor and hydraulic pump assembly.

Integrated electric motor and hydraulic pump assemblies in which a pump is mounted at one end of an electric motor are well known. In a typical arrangement, a splined rotary output shaft from the motor is connected to the pump unit to supply rotary drive thereto. The output shaft of the motor is supported upon bearings and is connected to or supports the rotor of the motor. A relatively complex high pressure sealing arrangement is provided to prevent the ingress of fluid into the stator. One technique by which such sealing is achieved is to provide a sleeve between the rotor and the stator, the sleeve being sealed at each end to the motor/stator housing. An arrangement of this general type is disclosed in U.S. Pat. No. 7,658,066.

The sealing arrangements typically used in such arrangements are relatively complex. For example, two or more seals may be provided at the pump end of the housing, incorporated into the bearings supporting the rotor shaft. As a result, installation tends to be relatively complex and time consuming. It is an object of the present invention to provide a motor in which at least some of the disadvantages with known arrangements are overcome or are of reduced effect.

According to the present invention there is provided a motor comprising a motor housing, a stator located within the motor housing, a rotor supported for rotation within the motor housing upon a rotor shaft, the rotor shaft being supported for rotation by bearings, and a sealing sleeve, wherein the sealing sleeve is of closed ended form and encircles the rotor, the sealing sleeve being sealed adjacent its open end to the motor housing.

By using a closed ended sealing sleeve, it will be appreciated that the need to seal both ends of the sleeve to the motor housing is avoided. Consequently, the seal arrangement is much simplified, leading to simplification of the assembly and installation procedure.

The sleeve is conveniently of two part form, an end part of the sleeve adjacent the closed end thereof, referred to herein as a plug, being removable. Such an arrangement permits access to the interior of the rotor shaft, if required, which may be used to gain access to parts of the pump. However, arrangements in which the sealing sleeve is of one part form may also be possible.

The sealing sleeve is conveniently arranged to support the bearings by which the rotor shaft is supported for rotation. Conveniently, a needle roller bearing arrangement is provided to support the part of the rotor shaft adjacent the closed end of the sleeve. Conveniently the part of the rotor shaft adjacent the open end of the sleeve is supported by means of angular contact bearings. The parts of the sleeve supporting the bearings are preferably of a thickness between, for example, 2.0 mm and 3.5 mm. An intermediate part of the sleeve, adjacent the stator, is conveniently of reduced thickness, for example of thickness approximately 0.8 mm. The reduction in sleeve thickness adjacent the stator ensures that minimal disruption to the electromagnetic properties of the motor arise as a result of the presence of the sleeve.

Although the sleeve could potentially be manufactured from a range of materials, conveniently it is of titanium.

Preferably, the rotor shaft is hollow, at least adjacent the closed end of the sleeve, and the closed end of the sleeve projects into the hollow of the rotor shaft. Conveniently, in such an arrangement, the rotor shaft is provided with one or more magnets, and a Hall sensor is positioned outside of the sleeve and operable to sense the rotor shaft position by sensing the magnetic field associated with the magnet(s).

The invention will further be described, by way of example, with reference to the accompanying drawing, FIG. 1, which is a diagrammatic sectional view illustrating part of a motor in accordance with an embodiment of the invention.

The motor illustrated diagrammatically in FIG. 1 is intended for use in driving a hydraulic pump (not shown). The motor comprises a housing 10 within which is located a stator 12, the windings of which are electrically connected to a connector 14 to allow the supply of power and control signals thereto. The housing 10 is of hollow form, and one end (the non-pump end) thereof is closed by an end cap 16. The opposite end of the housing 10, the pump end, is provided with screw threaded bores 18 to permit a pump housing (not shown) to be bolted thereto.

A rotor shaft 20 is supported for rotation within the housing 10, the rotor shaft 20 being supported, adjacent the pump end of the housing 10, by bearings 22 in the form of a pair of angular contact bearings, and adjacent the non-pump end, where little or no axial loads need to be accommodated, by needle roller bearings 24. The rotor shaft 20 carries a rotor 26 axially aligned with the stator 12, the magnetic field of the rotor 26 interacting with the field of the stator 12 such that appropriate energisation of the stator 12 results in the rotor 26 and rotor shaft 20 being driven for rotation within the housing 10.

The rotor shaft 20 is of hollow form and, at its end adjacent the pump end of the housing 10, the rotor shaft 20 is provided with a series of internal splines which, in use, cooperate with corresponding formations provided on a drive shaft of the pump such that the rotation of the rotor shaft 20 can be used to drive the pump.

In accordance with the invention, in order to provide the motor with a high pressure seal, a sealing sleeve 28 is provided. The sealing sleeve 28 has a first, open end adjacent the pump end of the housing 10, and a second, closed end adjacent the non-pump end of the housing 10. The sealing sleeve 28 encircles the rotor shaft 26, and the bearings 22, 24 are accommodated within the sealing sleeve 28 such that the sealing sleeve 28 extends between the bearings 22, 24 and the housing 10. The sealing sleeve 28 is manufactured from titanium and is of stepped wall thickness, including a portion adjacent the bearings 22 that is of a thickness between, for example, 3.0 mm and 3.5 mm, a slightly thinner portion adjacent the bearings 24 that is of a thickness between, for example, 2.0 mm and 2.5 mm, and a region of considerably reduced thickness, for example 0.8 mm, adjacent the stator 12. It will be appreciated that by providing a sleeve of stepped wall thickness in this manner, sufficient support for the bearings 22, 24 can be provided, whilst ensuring that the wall thickness is sufficiently small that minimal interference to the operation of the motor arises from the presence of the sleeve between the stator 12 and the rotor 26. Potting is conveniently used to support the thin section of the sleeve 28 adjacent the stator 12. This is particularly advantageous at the ends of the stator 12 where the sleeve 28 is of stepped form and is more susceptible to bending. The use of a thin walled titanium sleeve adjacent the stator 12 allows the distance between the rotor poles and the stator teeth to be significantly reduced. For example, the spacing may be reduced to approximately 3 mm from a spacing of approximately 7 mm that is typically applied in this type of stator and rotor arrangement. Although the sleeve 28 is conveniently of titanium construction, it will be appreciated that this need not always be the case and other materials could be used. For example carbon fibre may be used, or carbon fibre banding rings could be used to provide additional support to a titanium sleeve, for example at the locations of the bearings.

Adjacent its open end, the sleeve 28 is provided with a high pressure, for example 5000 psi, seal 30. A threaded nut 32 cooperates with the part of the sleeve 28 provided with the seal 30 and serves to ensure that the seal 30 is appropriately compressed to achieve the desired level of sealing, and also to secure the bearings 22 in position.

The sleeve 28 is in two part form, comprising a main sleeve part 34, and a plug 36 secured to an end of the main part 34, the plug 36 being sealed by a high pressure seal 38 to the main part 34 and shaped so as to project into the hollow interior of the adjacent end part of the rotor shaft 20. A nut 40 engages with part of the housing 10 and serves to retain the plug 36 in position.

The part of the rotor shaft 20 axially aligned with and located radially outward of the plug 36 is provided, on its inner surface, with a series of magnets 42, and axially aligned with the magnets 42 but located radially inwards of the plug 36 is a Hall effect sensor 44. It will be appreciated that by sensing the magnetic field, the Hall effect sensor is able to provide output signals indicative of the angular position of the rotor shaft 20 which may be used in deriving information indicative of, for example, the motor speed.

In use, it will be appreciated that the sealing sleeve 28 and associated high pressure seal 30 serve to provide a good seal whilst ensuring that the bearings 22, 24 and rotor shaft 20 are properly supported. The design of the plug 36 projecting into the end of the rotor shaft 20 allows the provision of a Hall Effect sensor to monitor the position of the rotor shaft in a simple and convenient manner. Furthermore, if access to the interior of the rotor shaft 20 is desired, for example to permit access to parts of the pump, then this can be achieved by removing the end cap 16 from the motor housing 10, and by removal of the plug 36. Resecuring the plug 36 in position, followed by resecuring of the end cap 16 to the housing 10, ensures that the sealing performance of the sealing sleeve is maintained. It will be appreciated that in such an arrangement only a single high pressure seal 30 is required between the sealing sleeve 28 and the pump housing 10, and consequently the installation process is considerably simplified compared to typical arrangements.

Where access to the hollow interior of the rotor shaft 20 is not required, then the sealing sleeve 28 may be manufactured so as to be of one piece form with the plug 36 and main part 34 thereof integral with one another. Such an arrangement further simplifies the assembly and avoids the need to provide a seal between the parts of the sleeve 28 at the non-pump end.

It will be appreciated that the description hereinbefore is merely of examples of the invention and that a number of modifications and alterations may be made thereto without departing from the scope of the invention.

The invention claimed is:

1. A motor comprising:
   a motor housing;
   a stator located within the motor housing;
   a rotor supported for rotation within the motor housing upon a rotor shaft, wherein at least a portion of the rotor shaft is hollow, the rotor configured to be supported for rotation by bearings;
   a sealing sleeve including a main sleeve part defining an open end of the sealing sleeve, the open end sealed with the motor housing, and a removable plug forming part of a closed end of the sealing sleeve, wherein the main sleeve part encircles the rotor, and the removable plug projects into the hollow portion of the rotor shaft and defines a space within the hollow portion; and
   the sealing sleeve supports the bearings so that the bearings are radially between an inner surface of the sealing sleeve and an outer surface of the rotor shaft.

2. The motor according to claim 1, wherein the bearings include a needle roller bearing arrangement to support the part of the rotor shaft adjacent the closed end of the sleeve.

3. The motor according to claim 1, wherein the bearings include angular contact bearings arranged to support the part of the rotor shaft adjacent the open end of the sleeve.

4. The motor according to claim 1, wherein the parts of the sleeve supporting the bearings are of a greater wall thickness than a part of the sleeve therebetween and adjacent the stator.

5. The motor according to claim 4, wherein the parts of the sleeve supporting the bearings are of a thickness between 2.0 mm and 3.5 mm.

6. The motor according to claim 4, wherein the part of the sleeve between the parts supporting the bearings and adjacent the stator is of thickness approximately 0.8 mm.

7. The motor according to claim 1, wherein the sleeve is, at least in part, of titanium.

8. The motor according to claim 1, wherein the rotor shaft is provided with one or more magnets, and a Hall sensor is positioned outside of the sleeve and operable to sense the rotor shaft position by sensing the magnetic field associated with the one or more magnets.

9. The motor according to claim 8, wherein the Hall sensor is positioned within the space in the removable plug where the removable plug projects into the hollow portion of the rotor shaft.

10. A motor comprising:
    a rotor having a rotor shaft, wherein at least a portion of the rotor shaft is hollow, the rotor configured to be supported for rotation by bearings;
    a sealing sleeve including a main sleeve part defining an open end of the sealing sleeve, the open end sealed with a motor housing, and a removable plug forming part of a closed end of the sealing sleeve, wherein the main sleeve part encircles the rotor and the removable plug projects into the hollow portion of the rotor shaft and defines a space within the hollow portion; and
    the sealing sleeve supports the bearings so that the bearings are radially between an inner surface of the sealing sleeve and an outer surface of the rotor shaft.

* * * * *